United States Patent Office 2,745,736
Patented May 15, 1956

2,745,736

PROCESS FOR THE PRODUCTION AND RECOVERY OF ZINC IN METALLIC FORM BY REDUCTION OF MATERIALS CONTAINING ZINC IN OXIDE FORM

Hirsch Loevenstein, New York, N. Y., and Paul Louis Adrien Belon, L'Argentiere, France, assignors to Pechiney Compagnie de Produits Chimiques et Electrometallurgiques, Paris, France, a corporation of France No Drawing. Application November 20, 1951,
Serial No. 257,428

Claims priority, application France November 27, 1950

15 Claims. (Cl. 75—86)

This invention relates to the reduction of zinc ores and other zinc oxide-containing materials for the production and recovery of zinc in metallic form.

The production of zinc by the thermal reduction of zinc oxide ores has heretofore been generally effected by heating the ore mixed with a suitable proportion of carbon at a temperature of 1100° to 1200° C. so that the reduction proceeds according to the reaction:

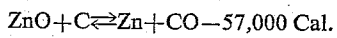

$$ZnO + C \rightleftharpoons Zn + CO - 57,000 \text{ Cal.}$$

Because of the highly endothermic nature of the reaction, the charge of ore and reducing agent must be provided with an important quantity of thermic energy from an extraneous source to cause the reaction to proceed satisfactorily. The reaction is normally carried out in a retort made of refractories which are poor heat conductors. As a consequence, the effective thermal yield of the coal or other fuel used to heat up the retort and maintain the charge at the desired reacting temperature is very low. For the above reasons, fuel represents an important item of the cost of zinc produced by this process.

As zinc exists in the vapor state at the reaction temperature and is readily oxidizable at that temperature, it is necessary in the above process to withdraw the zinc vapors, which are mixed with carbon monoxide, as rapidly as possible after they are formed to a condenser where they are rapidly cooled down. This necessitates the provision of condensers in the immediate vicinity of the reaction zone.

In spite of such precautions, an oxide film is formed on some of the zinc particles which causes the formation of a superficially oxidized zinc powder which collects in the condenser and is recoverable as zinc only with difficulty. Attempts have been made to prevent this formation of powder by various arrangements of the condenser but the percentage of it still remains fairly high.

Moreover, as the reaction is endothermic, it is difficult to bring it to completion within the retorts and, therefore, a not negligible portion of the zinc remains in the slag. The yield of the process is again diminished because a part of the zinc vapors is absorbed by the retort walls, requiring their being changed at frequent intervals. All these losses total up to a fairly high percentage of the zinc contained in the ore, and under the better operating practices as this process is carried out at the present time a yield of about 88% is considered to represent a good operating procedure.

Finally, the sudden cooling of the zinc vapors, although it diminishes the formation of the powder, results in the retention in the recoverable zinc of lead and cadmium that is usually present in zinc ores and reduced along with the zinc. This makes it necessary to subject the zinc to a later redistillation to refine the zinc.

It is an object of the present invention to provide a method of reducing zinc oxide ores and other materials containing zinc in the oxide form under conditions which insure a much higher thermal efficiency of the process and which avoids or minimizes oxidation of the zinc vapors as they are being carried to the condenser and condensed.

It is a further object of the invention to provide a method of smelting zinc oxide-containing materials which insures a relatively high recovery of the zinc values.

It is a still further object of the invention to provide a method of smelting zinc oxide-containing materials which makes it possible to dispose the condenser or a series of condensers at points relatively remote from the smelting zone and to remover the zinc in a relatively high state of purity separately from any lead or cadmium values that may be present without resort to redistillation of the zinc.

The present invention is based on the discovery that when silicon and aluminum in suitably proportioned amounts are substituted for carbon as the reducing agent it is possible to establish and maintain a controlled reduction of the zinc oxide with the silicon and aluminum. Under appropriate thermic conditions both silicon and aluminum react with zinc oxide to give strongly exothermic reactions, as follows:

With silicon—$ZnO + \frac{1}{2} Si \rightarrow \frac{1}{2} SiO_2 + Zn + 18,700$ Cal.

With aluminum—$ZnO + \frac{2}{3} Al \rightarrow \frac{1}{3} Al_2O_3 + Zn + 47,600$ Cal.

It has been heretofore recognized that various metals including iron, aluminum and silicon will react to reduce zinc oxide under certain conditions but the use of aluminum as the sole reducing agent has been looked upon as impractical because of the strongly exothermic nature of the reaction and the possibility that explosions would occur. The use of silicon alone has not been encouraged because of its relatively high cost.

We have found, however, that contrary to the previous predictions, a suitably proportioned mixture of aluminum and silicon may be used in reducing zinc oxide-containing materials without giving rise to uncontrollable conditions in the smelting zone or other untoward consequences. In fact, the regulation of the temperatures in the reaction zone within safe limits presents no serious difficulties when a suitable proportion of silicon is provided along with the aluminum. Moreover, the use of mixtures of aluminum and silicon, without addition of any reducing agent such as carbon that would give rise to volatile oxygen-containing reaction products, insures that the zinc vapors may be led away from the smelting zone to the condensers without any danger of reoxidation or formation of the undesired zinc powder.

Owing to the fact that the reactions are exothermic, they proceed to completion and leave almost no zinc in the slag thus appreciably increasing the recovery.

The process has the further advantage that it permits of the use of relatively large dimension furnaces where the charge may be directly heated to initiate the reduction reaction, as by radiant heat from an electric arc or by induction heating. In this way the loss of zinc in the refractory is avoided and the useful life of the refractories employed in the furnace structure is appreciably prolonged. The reduction may also be carried out in externally heated metal retorts without objectionable absorption of zinc by the walls of the retort.

Since the reactions are exothermic, all that is required is to bring the charge of zinc oxide-containing material and the metallic reducing agents up to the reacting temperature, whereupon the heat given off in the reactions themselves is usually sufficient to maintain the charge at the reaction temperature and transform the reduced zinc into vapors. Depending upon the type of furnace or retort employed, suitable cooling means may be used for withdrawing heat and in this way controlling the reduction.

Finally, since the zinc vapors are not mixed with any carbon monoxide or other oxygen-containing gas it is not necessary to hasten their condensation, and consequently it is possible, by lengthening the path between the reaction zone and the condensers and providing suitable baffles or rectification apparatus along such path, to separate out any lead or cadmium carried over with the zinc vapors, thus making it unnecessary to redistill the zinc for this purpose.

A still further advantage flowing from the exothermic nature of the process resides in the fact that the operating temperature may be maintained substantially lower than the customary 1100° to 1200° C. temperature employed in the prior process hereinbefore mentioned. Satisfactory results may be obtained by first bringing the temperature of the charge to between 925 and 1000° C. to initiate the reduction. Once the reduction has begun it will only be necessary to maintain the temperature sufficiently high to insure volatilization and removal of the zinc vapors as they are formed. When operating under reduced pressure the reduction may be initiated by heating to above the boiling point of zinc under the pressure conditions maintained. The reduction will then continue by maintaining the temperature above such reduced boiling point of zinc.

In proportioning the amount of the reducing materials with respect to the ore charge due consideration must be given to the amount of zinc oxide and other reducible materials in the charge such as iron oxide, oxides of lead, cadmium, etc. The amount of inert materials also will be taken into account. The relative proportions of silicon and aluminum will also be regulated with regard to the thermic conditions desired to be maintained and the nature and size of the furnace or retort in which the reduction is to be made.

With the above limiting conditions in mind the relative proportions of aluminum and silicon may be varied rather widely. It has been found, for example, that the silico-aluminum alloy produced directly from the ore in an electric furnace is especially suitable for use as the reducing agent in the present process, both because of the relative cheapness of the material and also because it is easily reduced to the powdered form and can, therefore, be uniformly mixed with the zinc oxide material in preparing the charge.

The residues from the recovery of aluminum from silico-aluminum alloys by the process of U. S. Reissue Patent No. 22,270 constitutes an even cheaper source of silicon and aluminum in the metal form, being a by-product. These residues may be used in the present process, preferably after a preliminary treatment to drive off any zinc remaining in them after the removal of the aluminum as conducted in such process. When the original alloy is a silico-aluminum alloy, the residues from such an aluminum recovery process, after removal of any remaining zinc, will normally contain from 55 to 80% Si, 8 to 25% Al, 5 to 15% Fe, and 0.5 to 6% Ti.

According to the preferred form of procedure for carrying on the present process, the reduction of the ore or other zinc oxide-containing material is conducted in a partial or substantially complete vacuum in a retort or furnace sealed from the atmosphere. By conducting the reduction under vacuum conditions the reaction temperature may be greatly lowered and the path from the reaction zone to the condensers still further lengthened so that there is increased opportunity for refinement of the zinc.

There are set forth in Table I below the results of tests carried on in a vacuum furnace using a roasted zinc ore concentrate having the following analysis:

| | Percent |
|---|---|
| Zn | 58.96 |
| Pb | 0.5 |
| S | 1.86 |
| CaO | 0.4 |
| Fe | 11.3 |

The balance being principally oxygen.

As the reducing agents, a residue from the distillation with metallic zinc of a silico-aluminum alloy derived by direct reduction of an aluminiferous ore in an electric furnace was used. This residue contained the following percentages of metallic silicon, aluminum, and iron:

| | Percent |
|---|---|
| Si | 56.67 |
| Al | 26.25 |
| Fe | 12.1 |

Table I

| Test No. | Temperature, °C. | Time, Hours | Vacuum in mm. of Mercury | Zinc, Percent in the Residue of Reaction | Percent of Zinc Recovered |
|---|---|---|---|---|---|
| 1 | 900 | 1 | 0.3 | 1.39 | 98 |
| 2 | 900 | 2 | 0.3 | 0.15 | 99.79 |
| 3 | 1,000 | 1 | 0.3 | 1.0 | 98.6 |
| 4 | 1,000 | 2 | 5 | 1.9 | 97.42 |
| 5 | 1,100 | 1 | 0.3 | 0.1 | 99.88 |
| 6 | 1,100 | 2 | 0.3 | 0.1 | 99.88 |
| 7 | 1,200 | 1 | 0.3 | 0.13 | 99.85 |
| 8 | 1,200 | 2 | 0.3 | 0.05 | 99.94 |

In order to obtain a maximum recovery it is usually best to operate under a vacuum of 1 mm. or less of mercury. At the same time, it will be seen by comparison of the results of test No. 4 with the results of tests Nos. 2, 6 and 8 that substantially higher recovery is obtained when a considerably lower degree of vacuum is maintained as compared with conventional practice using carbon as the reducing agent and operating at atmospheric pressure. In fact, the advantages of being able to recover the zinc free of oxide powder and in a relatively pure state without redistillation are sufficient in themselves, when considered from an economic standpoint, to make the process compare favorably with the conventional practice above mentioned even when the reduction is carried on at only moderately reduced pressures or even at atmospheric pressure.

It is preferred to use as the reducing agent silico-aluminum alloys containing less than about 65% aluminum with the balance either wholly or principally silicon because such alloys can be easily reduced to powder and thus made suitable for admixture with the ore charge. However, aside from the greater cost of reduction to requisite fineness to insure a satisfactory admixture of reducing agent and charge, there is no objection to the use of scrap aluminum and silicon alloys of the known types containing up to 30% silicon as additions to the zinc oxide-containing charge that is to be reduced according to the present process provided the total additions of aluminum and silicon are suitably proportioned to insure a controlled exothermic reaction between the metallic reducing agents and the zinc oxide.

The slag or sintered residue remaining at the conclusion of the reduction operation consists principally of silicon and aluminum as oxides along with more or less iron which may be present partly in the metallic state as derived from the reducing agent and partly in the form of oxides originally present in the ore as well as formed to a greater or less extent in the course of the reduction of the zinc oxide of the charge.

Even when the reactions are carried on at around or somewhat below 900° C., the residue will be in the sintered form. When the raw materials have been pre-agglomerated in the form of briquettes, as is preferred, the residue can be used as shaped construction material because it retains the shape of the original briquettes.

By adding to the residue suitable quantities of lime, slag or alumina, the composition of the residue may be made to approximate that of a cement. If sufficient iron is present in the metallic form or as the magnetic oxide to warrant its separation, the slag may be ground and then subjected to a magnetic concentration treatment to recover the iron before converting the residue to cement.

According to a modification of the process, the reduction may be carried on in the presence of a liquid bath of slag formed of a molten silicate or a mixture of molten silicates having a fairly low melting point, e. g., a mixture of calcium and aluminum silicates, and through which an electric current is passed. To this bath is added, in a continuous or intermittent manner, the mixture of zinc oxide-containing material and the metallic reducing agent. Reduced zinc is evaporated and passes off to the condenser and the residue of the reduction is absorbed by the bath. From time to time the bath is allowed to fall to a low zinc content by stopping the addition of ore charge and the excess of the liquid bath is run off.

This modified process has for an advantage a better thermal efficiency and a shorter reduction time. Another advantage is that it is unnecessary to briquette the raw material. The substantially zinc-free liquid slag may be used to form cement, either with or without preliminary cooling, grinding, and separation treatment to recover iron present therein.

We claim:

1. A process of reducing and recovering zinc in metallic form by the thermal reduction of zinc oxide which comprises forming a mixture of a material containing zinc oxide and a sufficient amount of a reducing agent consisting of an alloy of silicon and aluminum to reduce the zinc oxide present in the charge, said reducing agent containing aluminum in proportion not exceeding 65% with the balance principally silicon, heating the mixture to a temperature sufficient to initiate the reduction reaction between the zinc oxide and the aluminum and silicon constituents of the charge, and thereafter employing the heat evolved to volatilize substantially all of the zinc so produced and to maintain a sufficient temperature in the reaction zone to promote and maintain the reduction reaction without the application of extraneous heat.

2. The process according to claim 1 in which the reduction is carried on with the use as the reducing agent of an alloy of aluminum and silicon in which the proportion of aluminum does not exceed about 65% by weight with the balance principally silicon.

3. The process according to claim 1 in which the reduction is carried on with the use as the reducing agent of an alloy containing from 55 to 80% silicon and 8 to 25% aluminum with the balance consisting principally of iron.

4. The process according to claim 1 in which the reduction is carried on under a pressure less than atmospheric.

5. The process according to claim 1 in which the zinc vapors are withdrawn from the reaction zone substantially as fast as formed and then, without any intermediate condensation, cooled in successive stages to first condense any more easily condensable vapors than those of zinc and cadmium and thereafter to condense the zinc from the remaining vapors.

6. The process of reducing and recovering zinc in metallic form by the thermal reduction of zinc oxide which comprises forming a mixture of a material containing zinc oxide and a sufficient amount of an alloy consisting principally of aluminum and silicon to reduce the zinc oxide present in the charge, with the proportion of aluminum not exceeding 65% of the total weight of the alloy, heating the mixture to a temperature sufficient to initiate the reduction reaction between the zinc oxide and the aluminum and silicon constituents of said alloy and thereafter during the course of the reduction maintaining the temperature in the reaction zone within the range between the boiling point of zinc under the pressure conditions maintained and 1200° C. while withdrawing the zinc vapors substantially as fast as formed from the reduction zone.

7. The process according to claim 6 wherein the reduction is carried on under a pressure less than atmospheric.

8. The process according to claim 6 wherein the reduction is carried on at a pressure of not exceeding 5 mm. of mercury.

9. The process according to claim 6 wherein the reduction is carried on at a pressure of between 0.3 and 5 mm. of mercury.

10. The process according to claim 6 wherein the reduction is carried on at a pressure of not exceeding 5 mm. of mercury and the zinc vapors are withdrawn from the reaction zone substantially as fast as formed and subjected to a fractional condensation while still under reduced pressure to separate the zinc from any vapors of less volatile and more volatile metals that may be present.

11. The process according to claim 6 in which said mixture of zinc oxide and reducing metals is fed to a bath of molten slag and the reduction is carried on in the presence of the slag.

12. The process according to claim 6 in which the mixture of the material containing zinc oxide and the reducing metals is preformed into briquettes and the temperature of the reduction is maintained within the range 900–1200° C. so that the residue of the reduction reaction is recovered in the form of bricks approximating the shapes of the original briquettes.

13. The process of producing and recovering zinc in metallic form by thermal reduction of zinc oxide which comprises forming a mixture of a material containing zinc oxide and an alloy containing from 55 to 80% silicon and 8 to 25% aluminum, with the balance principally iron, heating the mixture under a pressure of 0.3 to 5 mm. of mercury to a temperature between about 925 and 1000° C. to initiate the reduction reaction and thereafter during the course of the reduction maintaining the temperature in the reaction zone within the range of 900 to 1300° C. while continuing to maintain a pressure of 0.3 to 5 mm. of mercury in the reaction zone, and withdrawing the zinc vapors substantially as fast as formed from said zone.

14. The process of producing and recovering zinc in metallic form by thermal reduction of zinc oxide which comprises forming a mixture of a material containing zinc oxide and a frangible alloy containing as its principal ingredients from 30 to 80% silicon and from 8 to 65% aluminum, with the balance principally iron, said alloy having been previously reduced to finely powdered form, heating the mixture under reduced pressure at a temperature between about 925 and 1000° C. to initiate the reduction reaction, and thereafter during the course of the reduction maintaining the temperature in the reaction zone within the range 900 to 1300° C. and allowing the reduction to proceed without application of further extraneous heat.

15. A process for the production of metallic zinc which comprises reacting zinc oxide with a sufficient amount of a reducing agent containing aluminum and silicon in metallic form to reduce said zinc oxide to zinc, said reducing agent containing from 8 to 65% by weight aluminum, whereby said zinc oxide is reduced to yield zinc together with the concomitant evolution of heat and employing the heat evolved to volatilize substantially all of the zinc so produced and to maintain a sufficient temperature in the reaction zone to promote and maintain the reduction reaction without the application of extraneous heat.

References Cited in the file of this patent

UNITED STATES PATENTS

| | | |
|---|---|---|
| 688,510 | Greene et al. | Dec. 10, 1901 |
| 802,941 | Rossi | Oct. 24, 1905 |
| 1,233,652 | Bavay | July 17, 1917 |
| 2,174,559 | Anderson et al. | Oct. 3, 1939 |
| 2,286,663 | Zintl et al. | Jan. 16, 1942 |
| 2,396,658 | Hybinette et al. | Mar. 17, 1946 |
| 2,461,697 | Queneau | Feb. 15, 1949 |